United States Patent
Tsubaki (12) 
(10) Patent No.: US 9,550,460 B2
(45) Date of Patent: Jan. 24, 2017

(54) FLAT CABLE WIRING STRUCTURE

(71) Applicant: Yazaki Corporation, Tokyo (JP)

(72) Inventor: Akira Tsubaki, Susono (JP)

(73) Assignee: Yazaki Corporation, Tokyo (JP)

(*) Notice: Subject to any disclaimer, the term of this patent is extended or adjusted under 35 U.S.C. 154(b) by 532 days.

(21) Appl. No.: 14/074,735

(22) Filed: Nov. 8, 2013

(65) Prior Publication Data

US 2014/0062186 A1    Mar. 6, 2014

Related U.S. Application Data

(63) Continuation-in-part of application No. PCT/JP2012/061710, filed on May 8, 2012.

(30) Foreign Application Priority Data

May 12, 2011    (JP) .................. 2011-107075

(51) Int. Cl.
| | | |
|---|---|---|
| *B60R 16/02* | (2006.01) | |
| *B60R 16/027* | (2006.01) | |
| *H02G 11/02* | (2006.01) | |
| *H02G 3/04* | (2006.01) | |

(52) U.S. Cl.
CPC ......... *B60R 16/0215* (2013.01); *B60R 16/027* (2013.01); *H02G 11/02* (2013.01); *H02G 3/0437* (2013.01)

(58) Field of Classification Search
CPC ... B60R 16/0215; B60R 16/027; H02G 11/02; H02G 3/0437
USPC ...................................... 307/10.1
See application file for complete search history.

(56) References Cited

U.S. PATENT DOCUMENTS

| | | | |
|---|---|---|---|
| 6,213,797 B1* | 4/2001 | Best .................. | B60R 16/027 439/15 |
| 6,267,430 B1 | 7/2001 | Cresseaux | |
| 6,997,499 B2 | 2/2006 | Tsubaki et al. | |
| 2004/0159764 A1* | 8/2004 | Oshima ................ | B60N 2/0232 248/429 |

(Continued)

FOREIGN PATENT DOCUMENTS

| | | |
|---|---|---|
| FR | 2790236 A1 | 9/2000 |
| JP | 10-112922 A | 4/1998 |

(Continued)

OTHER PUBLICATIONS

Translation of WO 2011/010406.*

(Continued)

*Primary Examiner* — Rexford Barnie
*Assistant Examiner* — Elim Ortiz
(74) *Attorney, Agent, or Firm* — Locke Lord LLP (57) ABSTRACT

Disclosed is a flat cable wiring structure allowed to be mounted to all automobiles and corresponding to various circuits. The flat cable wiring structure is provided with a flat cable winder including a case arranged at an end of the rail, and a rotating body accommodated in the case rotatably about a virtual central axis vertical to the car body floor and configured to wind the flat cable; and a flat cable housing extending in a longitudinal direction of the rail and including a pair of walls arranged along an outside surface of the rail and parallel to a side wall vertical to the rail, and a bottom wall connecting the pair of walls.

6 Claims, 7 Drawing Sheets

(56) References Cited

U.S. PATENT DOCUMENTS

| | | | |
|---|---|---|---|
| 2014/0353415 A1* | 12/2014 | Katsuramaki | H02G 11/02 242/371 |
| 2015/0001327 A1* | 1/2015 | Hamada | B65H 75/44 242/376 |
| 2016/0013627 A1* | 1/2016 | Katsuramaki | B65H 75/28 242/377 |

FOREIGN PATENT DOCUMENTS

| | | | | |
|---|---|---|---|---|
| JP | 2001-128350 A | | 5/2001 | |
| JP | 2001128350 A | * | 5/2001 | |
| JP | 2004-210103 A | | 7/2004 | |
| JP | 2005-059745 A | | 3/2005 | |
| JP | 2010-213399 A | | 9/2010 | |
| JP | WO 2011010406 A1 | * | 1/2011 | ............... B60N 2/06 |
| JP | 2011-025744 A | | 2/2011 | |
| WO | WO-2011/010406 A1 | | 1/2011 | |

OTHER PUBLICATIONS

Supplementary European Search Report dated Nov. 13, 2014, issued for the European patent application No. 12782086.8.
International Search Report dated Jul. 10, 2012, issued for PCT/JP2012/061710.

* cited by examiner

FIG. 13
PRIOR ART ly about a virtual central axis vertical to the car body floor and configured to wind the flat cable; and a flat cable housing extending in a longitudinal direction of the rail and including a pair of walls arranged along an outside surface of the rail and parallel to a side wall vertical to the rail, and a bottom wall connecting the pair of walls.

FLAT CABLE WIRING STRUCTURE

TECHNICAL FIELD

This invention relates to flat cable wiring structures in which a movable member is slidably attached to a rail arranged on a car body floor and a flat cable is wired from the car body floor to the movable member

BACKGROUND ART

Slide sheets (movable members) in automobiles are configured to attach electric components thereto such as sheeting sensors which detest whether passengers have sat. Therefore, for the automobiles provided with slide sheets have been employed various types of feeders for slide sheets which guide wire harness to the side sheets from car body floor (see PTL 1 or 2, for example).

A feeder for slide sheet described in the PTL 1 is provided with rail as a case including a harness housing, a movable member (slide sheet) which slides the rail, a wire harness of which one end is supported by the movable member and the other end by the rail bending in the harness housing. Since this conventional feeder for slide sheet accommodates the wire harness in the wire housing with the wire harness bent, the wire harness may become large-sized.

Figure 12:
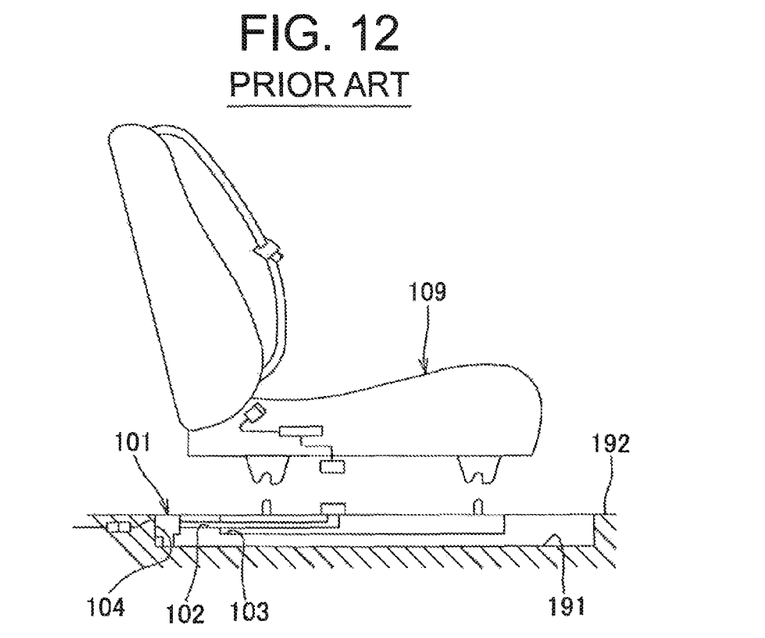
FIG. 12 is a plane view illustrating cross-sectionally in part a conventional feeder for slide sheet.
Figure 13:
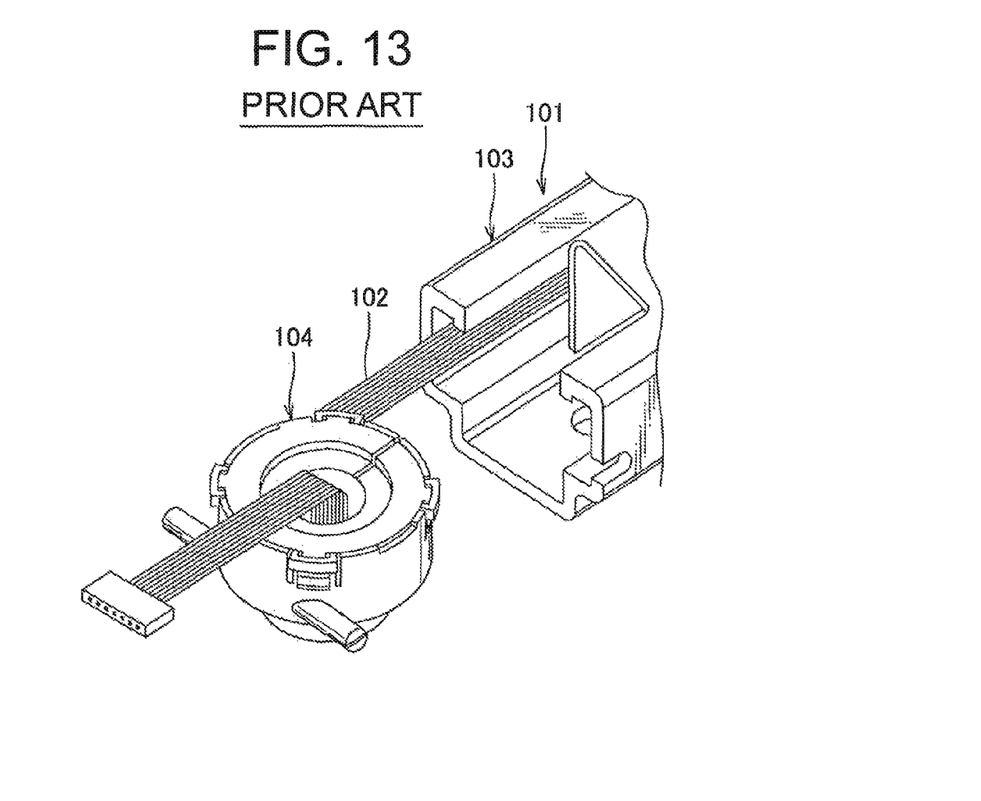
FIG. 13 is a perspective view illustrating a main part of the feeder for slide sheet shown in FIG. 12.

Thereby, in order to resolve the above problem there have been advocated a conventional feeder for slide sheet as shown in FIGS. 12 and 13. FIG. 12 is a cross-sectional plane view illustrating in part a conventional feeder for slide sheet. FIG. 13 is a perspective view illustrating a main part of the conventional feeder for slide sheet shown in FIG. 12. As shown in FIG. 13, the conventional feeder for slide sheet 102 is provided with a rail 103 to which the slide sheet 109 is attached, a winding device 104 disposed at an end of the rail 103 around which a flat cable 102 is wound. The aforementioned rail 103 is configured to wire the flat cable 102 there within. The rail 103 and the winding device 104 is positioned on a bottom of a groove 191 recessed from a surface of the car body floor 192. Since this conventional feeder for slide sheet 101 is configured to wind an excess of the flat cable 102 with the winder 104, eliminating of the harness housing described in the PTL 1 allowed for downsizing.

CITATION LIST

Patent Literature

[PTL 1]
Japanese Patent Application Laid-Open Publication No. 2005-59745
French Patent Application Laid-Open Publication No. FR2790236

SUMMARY OF INVENTION

Technical Problem

Disadvantageously, there have been drawbacks to be described below which the aforementioned conventional feeder for slide sheet 101 poses. Namely, since the conventional feeder for slide sheet 101 has the flat cable 102 wired therewithin, there have been drawbacks that the flat cable 102 cannot be wired depending on the form of the rail 103. Furthermore, since the flat cable 102 is wired within the rail 103, there have been drawbacks that response to various circuits disturbs the flat cable from being widened.

Therefore, an object of the present invention is to resolve drawbacks posed. Namely, the present invention is to provide a flat cable wiring structure which can be mounted to all automobiles without depending on the form of the rail and corresponds to various circuits.

Solution to Problem

According to one aspect of the invention there is provided a flat cable wiring structure in which a movable member is slidably attached to a rail arranged on a car body floor and a flat cable is wired from the car body floor to the movable member, the flat cable wiring structure comprising: a flat cable winder including a case arranged at an end of the rail, and a rotating body accommodated in the case rotatably about a virtual central axis vertical to the car body floor and configured to wind the flat cable; and a flat cable housing extending in a longitudinal direction of the rail and including a pair of walls arranged along an outside surface of the rail and parallel to a side wall vertical to the rail, and a bottom wall connecting the pair of walls.

Preferably, the case is provided with a horizontal base wall configure to be arranged on the car body floor, a peripheral wall upstanding from the base wall, and a shaft upstanding from the base wall and passed through the through hole including the virtual central axis.

Preferably, the flat cable wiring structure further comprises a protector covering a part wired from the flat cable housing to the movable member of the flat cable traversing the rail.

Preferably, the flat cable housing is provided with a flange extending inwardly from each upper end of the pair of walls in a direction approaching each other.

Preferably, the flat cable wiring structure further comprises a partition wall disposed between the pair of walls and parallel to each of the pair of walls, and a ceiling wall opposed to the bottom wall and connecting one of the pair of walls and the partition wall.

Advantageous Effects of Invention

According to the one aspect of the invention, since the flat cable wiring structure in which the movable member is slidably attached to the rail arranged on the car body floor and the flat cable is wired from the car body floor to the movable member, comprises: the flat cable winder including the case arranged at the end of the rail, and the rotating body accommodated in the case rotatably about the virtual central axis vertical to the car body floor and configured to wind the flat cable; and the flat cable housing extending in the longitudinal direction of the rail and including the pair of walls arranged along the outside surface of the rail and parallel to the side wall vertical to the rail, and the bottom wall connecting the pair of walls, the flat cable is made wired outside the rail, and is thus, without depending on the form of the rail, mounted to all the automobiles, and increase of the width of the flat cable allows the flat cable wiring structure to correspond to various circuits.

According to the present invention, since the case is provided with the horizontal base wall configure to be arranged on the car body floor, the peripheral wall upstanding from the base wall, and the shaft upstanding from the base wall and passed through the through hole having the virtual central axis, the flat cable winder, even when stomped by the passenger, is configured to prevent its rotating body from being damaged.

According to the present invention, since the flat cable wiring structure comprises the protector covering the part wired from the flat cable housing to the movable member of the flat cable traversing the rail, the part wired from the flat cable housing to the movable member of the flat cable traversing is made protected.

According to the present invention, since the flat cable housing is provided with the flange extending inwardly from each upper end of the pair of walls in the direction approaching each other, foreign object such as fluid or sand is prevented from entering into the flat cable housing.

According to the present invention, since the flat cable wiring structure comprises the partition wall disposed between the pair of walls and parallel to each of the pair of walls, and the ceiling wall opposed to the bottom wall and connecting one of the pair of walls and the partition wall, foreign object such as fluid or sand is prevented from entering into the flat cable housing.

DESCRIPTION OF EMBODIMENTS

First Embodiment

With reference now to FIGS. 1 to 8 is discussed a feeder provided with a flat cable wiring structure 1 according to a first embodiment of the present invention. The above feeder 10 is provided with a plurality of flat cables 2 (three in the shown figures) wired from a car body floor to a slide sheet (not shown), a pair of connectors 24a, 24b attached to both ends of the three flat cables 2, a flat cable wiring structure 1. The slide sheet corresponds to "movable body" in the claims.

Figure 1:
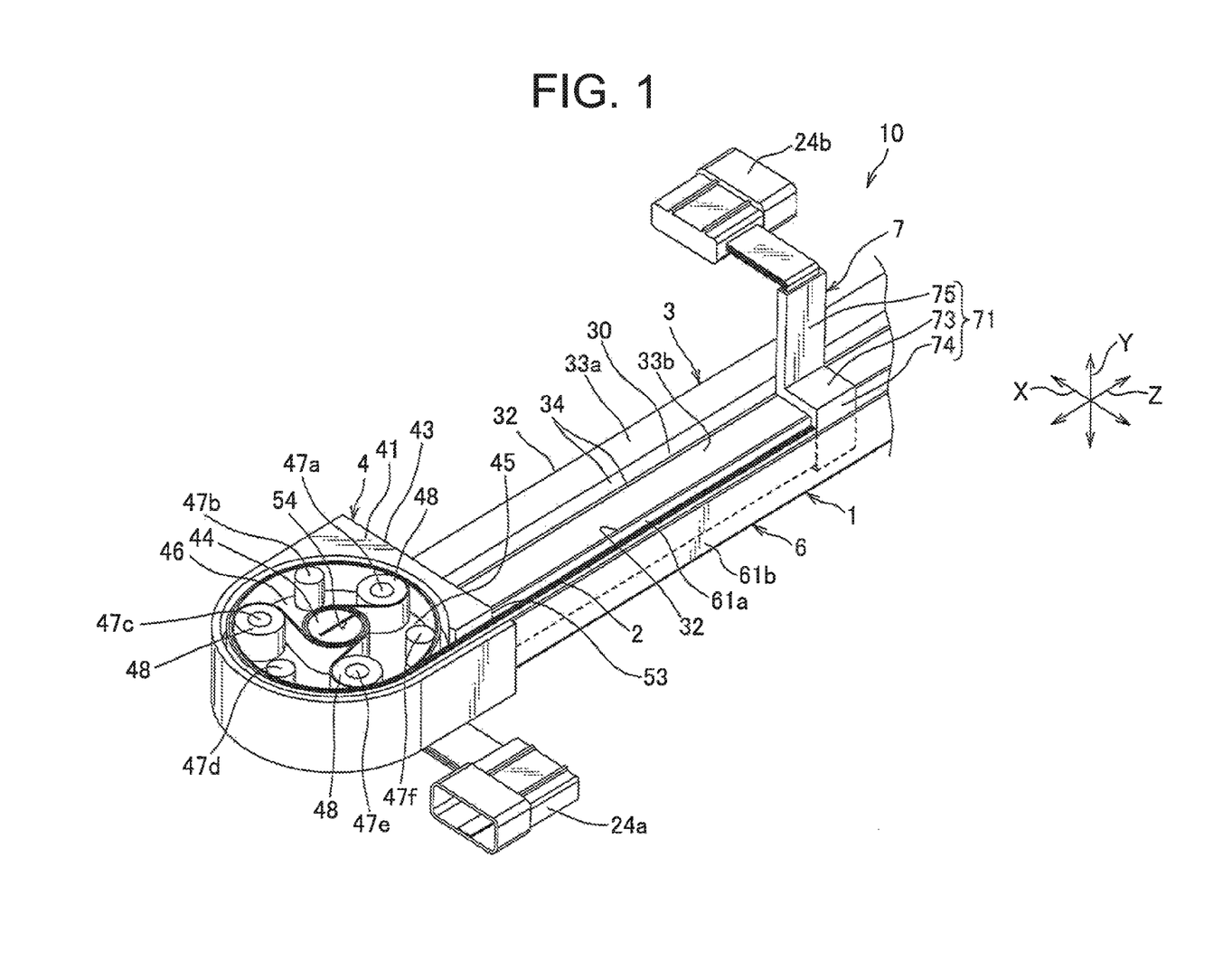
FIG. 1 is a perspective view illustrating a first embodiment of a feeder provided with a flat cable wiring structure according to the present invention.

As shown in FIG. 1, the flat cable wiring structure 1 is one for attaching the slide sheet slidably to a rail 3 disposed on the car body floor and for wiring the flat cable 2 from the car body floor to the slide sheet.

The arrow Z in FIG. 1 indicates a sliding direction of the slide sheet, or a longitudinal direction of the rail 3. And the arrow X in FIG. 1 indicates a width direction of the rail 3. Also, the arrow Y in FIG. 1 indicates a height direction of the rail 3 orthogonal to both the arrows Z and X.

Figure 2:
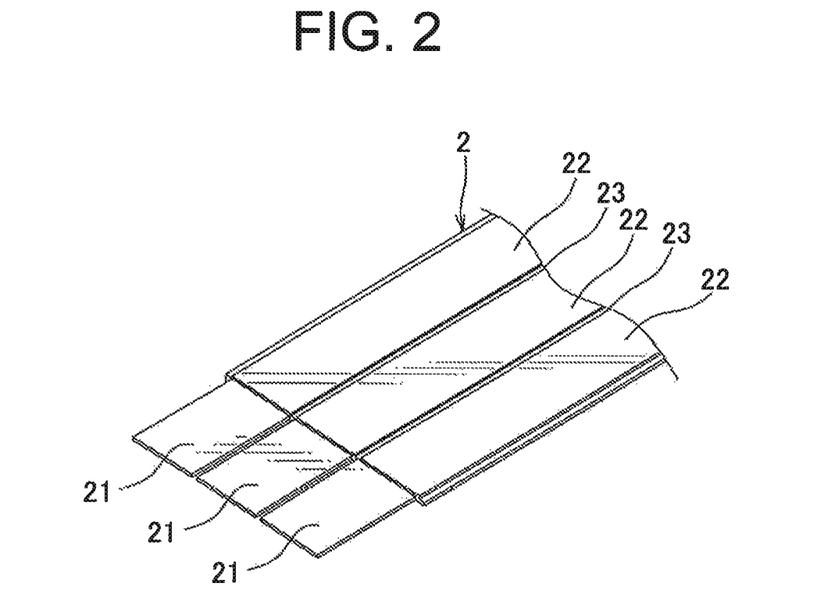
FIG. 2 is a perspective view illustrating a fiat cable composing the feeder shown in FIG. 1.

The flat cables 2, as shown in FIG. 2, each include a plurality of core wires 21 parallel to each other (three in the shown figures), an insulating cover 22 covering the each core wire 21, an insulating coupler 23 coupling the covers 22 adjacent to each other. The core wire 21 is made of a plurality of conductive wire braided. The cover 22 and the coupler 23 are made of synthetic resin and molded integrally. The flat cables 2 are each provided with the core wire 21, the cover 22 and the coupler 23 aforementioned and are formed into plate shape. FIG. 2 indicates only one of the three flat cables 2.

Figure 3:
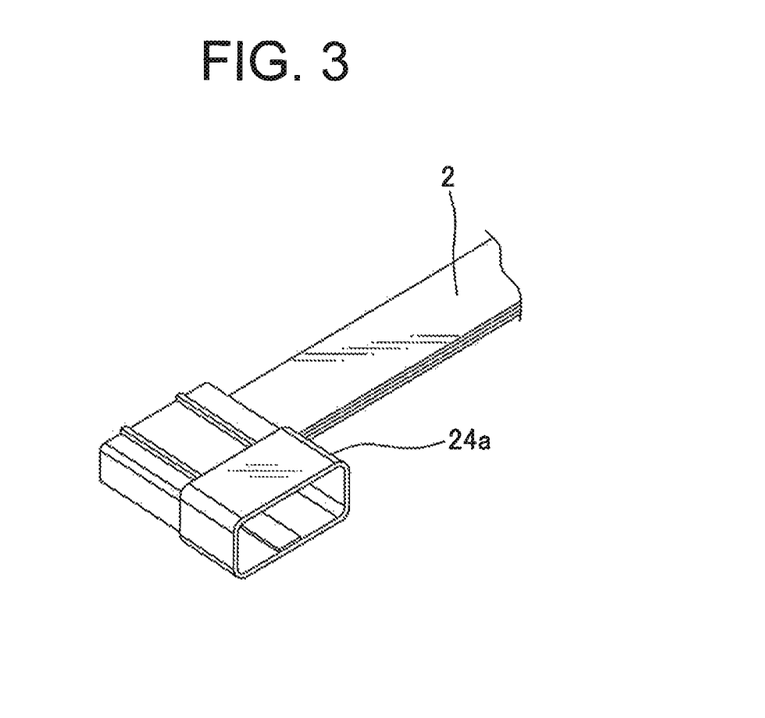
FIG. 3 is a perspective view illustrating a state in which the connector is attached to the flat cable shown in FIG. 2.

The flat cables 2 of the three, with stacked to each other (layered), are configured to attach the pair of connectors 24a, 24b to both ends thereof. As shown in FIGS. 1 and 3, of the pair of connectors 24a, 24b, the one connector 24a is connected to a power source circuit and the other connector 24b a load circuit (slide sheet).

The flat cable wiring structure 1 is, as shown in FIG. 1, disposed at en end of the rail 3 and provided with a flat cable winder 4 around which excess of the flat cable 2 is wound, a flat cable housing 6 extending in a longitudinal direction (the arrow Z direction), and a protector 7 protecting a part of the flat cable 2 wired from the flat cable housing 6 to the slide sheet.

The rail 3 is made in such a fashion that strip-like long metal plate is cut in a certain length, and the cut metal plate is processed with such roll forming. This rail 3 is, as shown in FIG. 1, composed of a horizontal bottom wall (not shown) placed onto a surface of the car body floor, a pair of side walls 32 upstanding from each both ends of the bottom wall in the width direction (the arrow X direction), a pair of opposite walls 33a, 33b extending from a top end of the each side wall 32 in a direction approaching each other so as to be opposed to the bottom wall, and a pair of inside walls 34 extending from each end of the opposite walls 33a, 33b away from the side wall 32 toward the bottom wall. The pair of side walls 32 is arranged orthogonal to the bottom wall. The rail 3 is formed in such a fashion that its cross-section is equal across from one end to the end thereof in the longitudinal direction (the arrow Z direction).

The pair of inner walls 34 is separated from each other. Thereby, between the pair of inner walls is formed a slit 30 opening toward an upper side of the rail 3, i.e., the slide sheet, extending from the one end to the other end of the rail 3 in the longitudinal direction (the arrow Z direction).

The rail 3, the flat cable winding structure 4, and the flat cable housing 6 are disposed between the car body floor and the slide sheet. Namely, the rail 3, the flat cable winding structure 4, and the flat cable housing 6 are disposed on the surface of the car body floor, but may be disposed from the surface of the car body floor to a bottom of a recessed groove.

Figure 4:
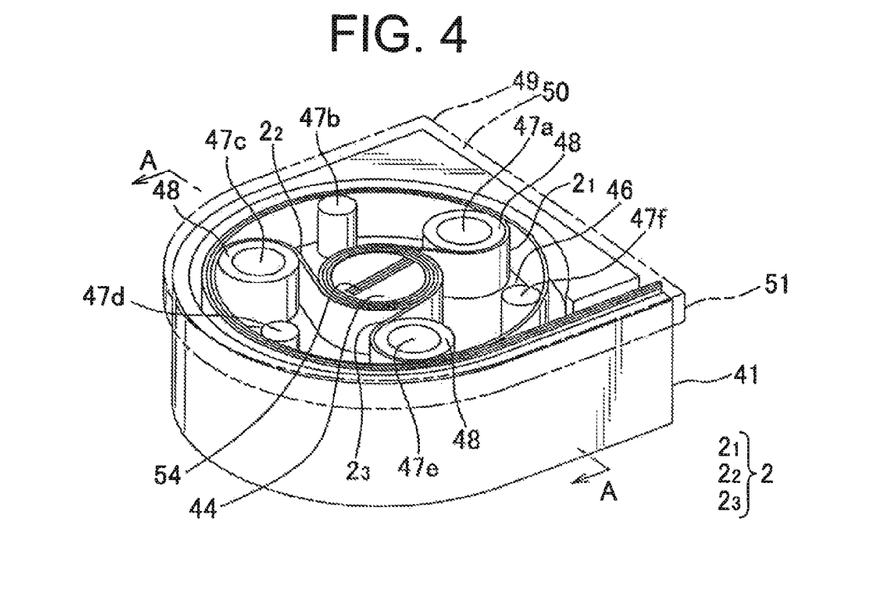
FIG. 4 is a perspective view illustrating a flat cable winder composing the flat cable wiring structure shown in FIG. 1.

The flat cable winder 4 is, as shown in FIG. 4, provided with a tubular lower case with bottom 41, a rotatable body 45 accommodated rotatably in the lower case 41 and configured to wind the flat cable 2, an upper case 49 covering an opening of the lower case 41, a not-shown biasing means biasing the rotating body 45 toward winding direction (clockwise direction). The lower case 41, the upper case 49, and the rotating body 45 are made of synthetic resin. The lower case 41 corresponds to "case" in the claims.

Figure 5:
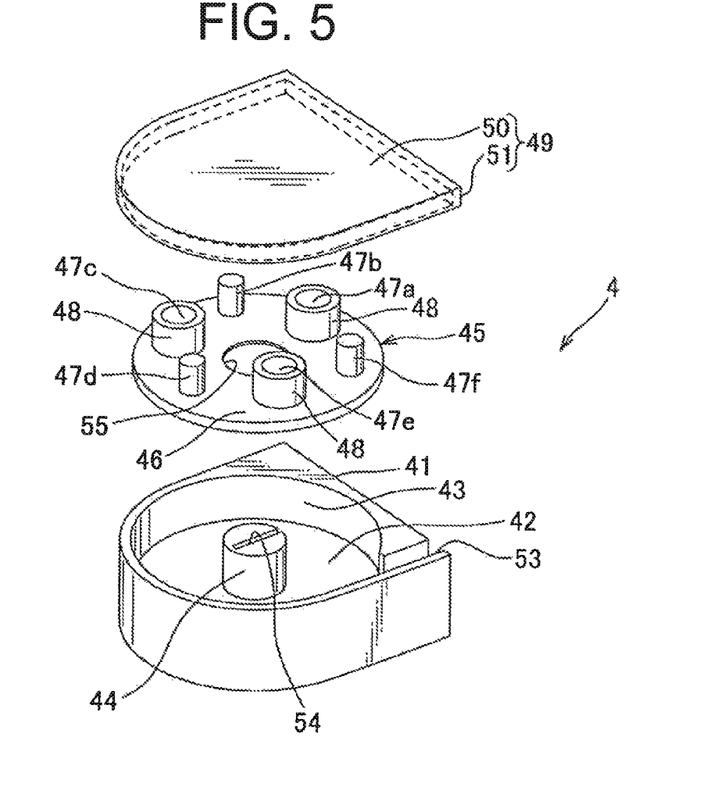
FIG. 5 is an exploded view illustrating the flat cable winder shown in FIG. 4.
Figure 6:
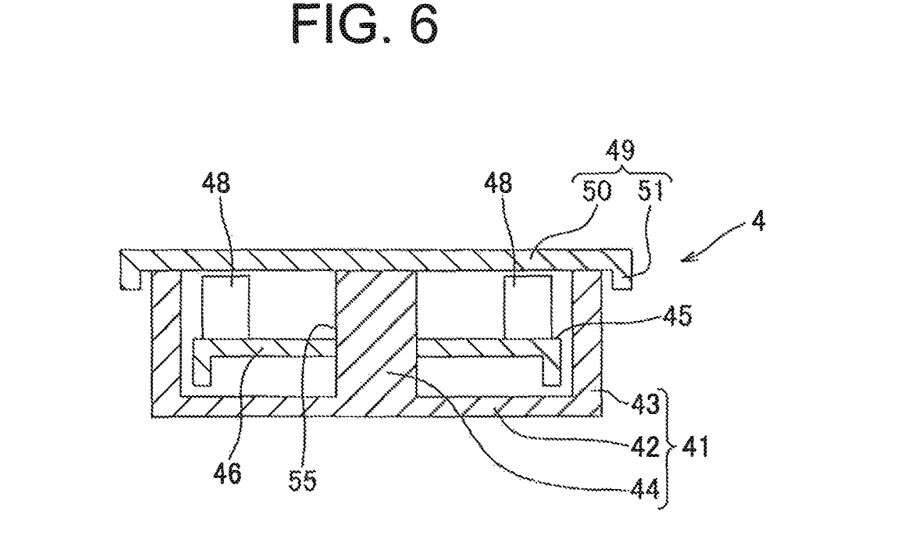
FIG. 6 is a cross-sectional view taken along A-A line in FIG. 4.

The lower case 41 is as shown in FIGS. 5 and 6, provided with a horizontal base wall 42 stacked onto the surface of the car body floor, a peripheral wall 43 upstanding from a side edge of the base wall 42, a columnar large-diameter shaft 44 upstanding from a center of the base wall 42 and passed through the through hole 55 of the rotating body 45. The peripheral wall 43 is formed such that its inner peripheral face is formed circular. The peripheral wall 43 is formed such that a part thereof is notched and includes a harness outlet 53 formed such that an edge of an upper end of the peripheral wall 43 is opened. The peripheral wall 43 and the large-diameter shaft 44 are formed in the same height. The large-diameter shaft 44 follows the arrow Y. The large-diameter shaft 44 is provided with a slit 54 into which the three flat cables 2 are inserted. The slit 54 is disposed at a middle of the large-diameter shaft 44. The slit 54 is formed in the arrow Y direction from an upper end to a lower end of the large-diameter shaft 44. The slit 54 is arranged such that its edge in the longitudinal direction opens from the upper end to the lower end of the large-diameter shaft 44. In the large-diameter shaft 44, one end of the three flat cables 2, with them bent in L-shape in the arrow Y direction, is inserted into the slit 54 to be fixed. In FIG. 6 the slit 54 of the large-diameter shaft 44 is omitted.

The rotating body 45, as shown in FIG. 5, is provided with a circular plate 46 stacked onto the base wall 42 of the lower case 41, columnar six shafts 47a, 47b, 47c, 47d, 47e, and 47f, and three divided rollers 48 attached rotatably to three shafts 47a, 47c, and 47e every other shaft of 47a, 47b, 47c, 47d, 47e, and 47f. The circular plate 46 is provided with a though hole 55 at its center including a virtual center axis in the arrow Y direction. Namely, the through hole 55 follows the arrow Y direction. The six shafts 47a, 47b, 47c, 47d, 47e, and 47f are arranged at regular intervals in a peripheral direction on a concentric circle centered about a virtual central axis. The shafts 47a, 47b, 47c, 47d, 47e, and 47f each have the same size. The three divided rollers 48 are column-shaped. The divided rollers 48 include an outer peripheral face with the same axis as an inner peripheral face. The divided rollers 48 each have the same size.

The upper case 49 as shown in FIG. 5, is provided with a cover 50 covering an opening of the lower case 41, an overlapped wall 51 placed onto the peripheral wall 43 of the lower cover.

The one end of the three flat cables 2, with them layered, is inserted into, and fixed to, the slit 54 of the large-diameter shaft 44 in the lower case 41, is passed through a not-shown hole disposed in the base wall 42 of the lower case 41, and is guided outside the lower case 41. Of the three flat cables $2_1$, $2_2$, and $2_3$, as shown in FIG. 4, the other ends are each wired independently. One flat cable $2_1$ of the three is turned from the large-diameter shaft 44 along the divided roller 48 attached to the shaft 47a, and is placed subsequently onto the shaft 47b adjacent to the divided roller 48 in the counterclockwise direction, the divided roller 48 attached to the shaft 47c, the shaft 47d, and the divided roller 48 attached to the shaft 47e so as to be wired counterclockwise. The flat cable $2_2$ is turned from the large-diameter shaft 44 along the divided roller 48 attached to the shaft 47c. The flat cable $2_3$ is turned from the large-diameter shaft 44 along the divided roller 48 attached to the shaft 47e. The flat cables $2_1$, $2_2$, and $2_3$ each lying independent are wired counterclockwise around the large-diameter shaft 44 and are layered to each other, guided out of the harness outlet 53.

Figure 7:
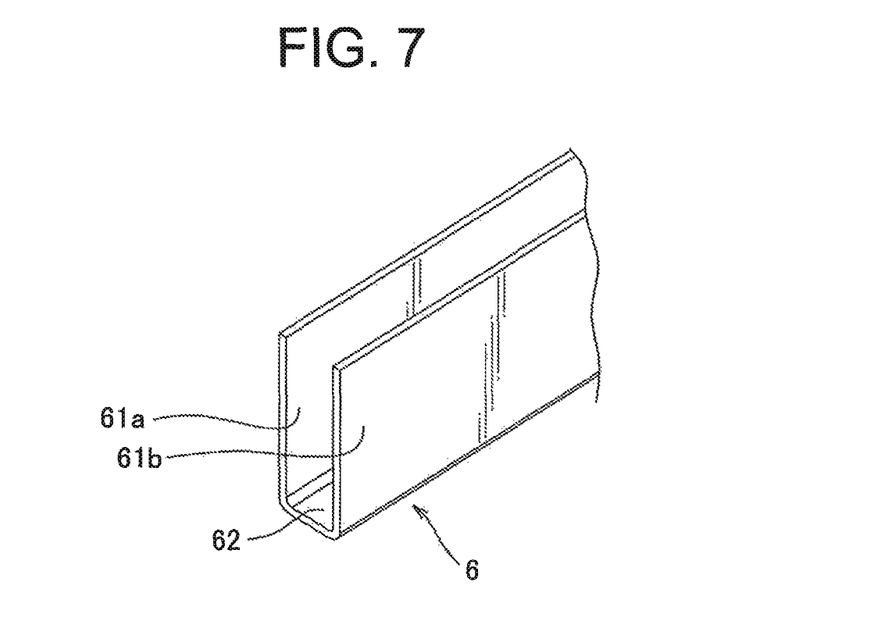
FIG. 7 is a perspective view illustrating a flat cable housing composing the flat cable wiring structure shown in FIG. 1.

The flat cable housing 6 is as shown in FIG. 7 provided with a pair of walls 61a, 61b parallel to the side wall 32 of the rail 3, and a bottom wall 62 coupling together edges of lower ends of the pair of walls 61a, 61b. The pair of walls 61a, 61b are separated to each other. One of the wall 61a of the pair of walls 61a, 61b is stacked onto the side wall 32 of the rail 3. Alternatively, the flat cable housing 6 is arranged along the longitudinal direction of the rail 3 (the arrow Z direction), and one of the wall 61a of the pair of walls 61a, 61b is arranged adjacent to the side wall 32 of the rail 3. Namely, by that the flat cable housing 6 the one wall 61a is stacked onto the side wall 32 of the rail 3 or that the flat cable housing 6 is arranged along the longitudinal direction of the rail 3 and the one of the wall 61a of the pair of walls 61a, 61b is arranged adjacent to the side wall 32 of the rail 3 is meant that "the flat cable housing 6 is arranged along an outside of the rail 3."

The flat cable housing 6 accommodates therewithin the other end of the flat cables 2 guided out of the harness outlet 53. The flat cable housing 6 is formed to equal in length in the longitudinal direction (the arrow Z direction) to the rail 3. The flat cable housing 6 is formed to equal in cross-sectional form from one end to the other in its longitudinal direction. The flat cable housing 6 is made of synthetic resin.

Figure 8:
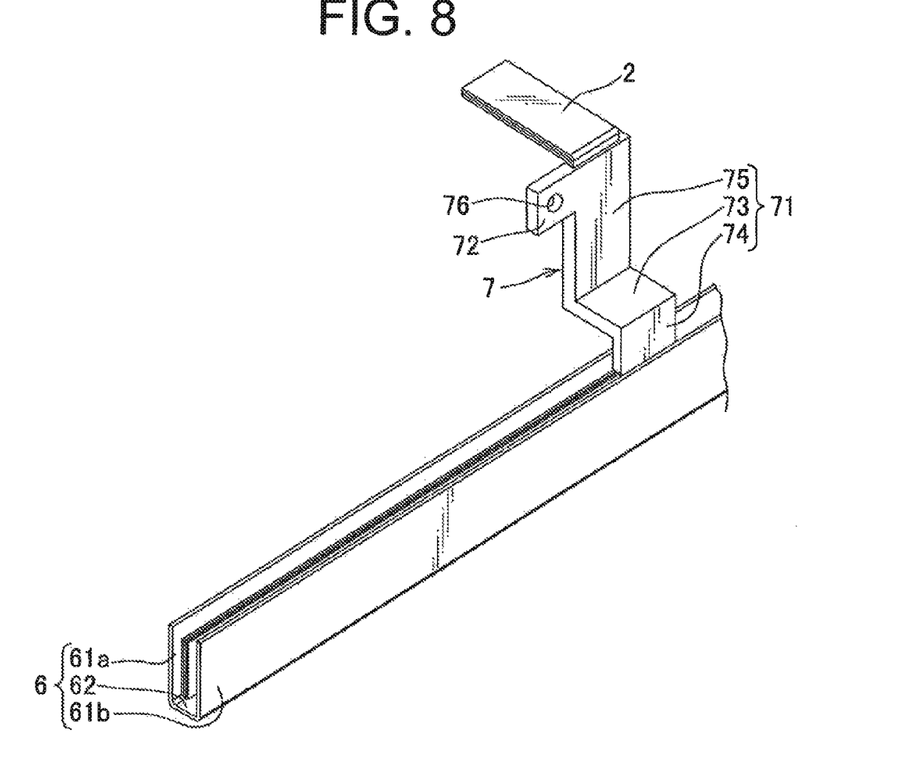
FIG. 8 is a enlarged perspective view illustrating in part the flat cable wiring structure shown in FIG. 1.

The protector 7 is, as shown in FIGS. 1 and 8, provided with a protector body 71 covering a part of the flat cable wired from the flat cable housing 6 to the slide sheet, and a fixing part 72 fixing the protector body 71 to a sheet frame composing the slide sheet. The protector 7 is injection-molded to a part wired from the flat cable housing 6 of the flat cable 2 to the slide sheet. In FIG. 1 the fixing part 72 is omitted.

The protector body 71 is, as shown in FIGS. 1 and 8, is formed into clamp shape by a horizontal part 73 opposed to the one opposite wall 33b adjacent to the flat cable housing 6, a first vertical part 74 continued to one end of the horizontal part 73 in the arrow X direction and positioned between the pair of walls 61a, 61b of the flat cable housing 6, and a second vertical part 75 continued to the other end of the horizontal part 73 and in parallel with the first vertical part 74 in the rail 3. The protector body 71 (the protector 7) traverses the rail 3.

The first vertical part 74 covers a part bent into L-shape of one end of the three flat cables 2.

The fixing part 72 is, as shown in FIG. 8, disposed at an end of the second vertical part 75 toward the flat cable winder 4 and away from the horizontal part 73. The fixing part 72 is plate-shaped and is provided with a bolt through hole 76 at a center thereof. The fixing part 72 secures the protector body 71 to the sheet frame by a hole (not shown) formed in the sheet frame and the bolt through hole 76 communicating and being threaded by a bolt.

Then, described is a manufacturing procedure of the aforementioned structure of the feeder 10. In the first place, the three flat cables 2 are stacked (layered), the protector 7 is attached to a part of the three flat cables 2 to be wired from the flat cable housing 6 to the slide sheet, at the end of the rail 3 in the longitudinal direction the flat cable winder 4 is arranged, and the wall 61a of the flat cable housing 6 is stacked onto the side wall 32 of the rail 3.

Then, the one end of the three flat cables 2 is inserted into and fixed to the slit 54 of the large-diameter shaft 44 in the lower case 41, is inserted into the hole disposed in the base wall 42 of the case 41, and is guided out of the lower case 41. Then, to the one end of the flat cables 2 guided out of the lower case 41 is attached the connector 24a, and the connector 24a is connected with a circuit of a power source.

Then, the other of the three flat cables are each folded along the each divided roller 48, are placed on the shafts 47 counterclockwise adjacent to the each divided roller 48, are wired counterclockwise, and guided out of the harness outlet 53. At this time, the three flat cables 2 guided out of the harness outlet 53 are stacked to each other (layered). Then the other end of the three flat cables 3 stacked to each other is accommodated in the flat cable housing 6, the horizontal part 73 of the protector 7 is stacked onto the opposite wall 33*b* of the rail 3, the first vertical part 74 of the protector 7 is inserted into the flat cable housing 6, and the first vertical part 74 is positioned inside the flat cable housing 6. Last, the other end of the flat cable 2 is attached to the connector 2, and the connector is connected with a circuit of a load (slide sheet). Thus the feeder 10 is completed.

According to the above-mentioned embodiment, since the winder 4 includes the case 41 as a case arranged at the end of the rail 3, and the rotating body 45 accommodated in the case 41 rotatably about the virtual central axis vertical to the car body floor and configured to wind the flat cable 2; and the flat cable housing 6 including the pair of walls 61*a*, 61*b* arranged along the outside surface of the rail 3 and parallel to the side wall vertical to the rail 3, and the bottom wall 62 connecting the pair of walls 61*a*, 61*b*, the cable housing 6 extending in the longitudinal direction o the rail 3 (the arrow Z direction), the flat cable 2 is made wired outside the rail 3, and is thus, without depending on the form of the rail 3, allowed to be mounted to all the automobiles. In the flat cable wiring structure 1 the flat cable 2 is each provided with three core wires 21, but the invention is, not limited to this, provided with more than three core wires 21 and increase of the width of the flat cable 2 allows for various circuits.

Since the lower case 41 is provided with the horizontal base wall 42 configured to be arranged on the car body floor, the peripheral wall 43 upstanding from the base wall 42, and the shaft 47 upstanding from the base wall 42 and passed through the through hole 55 including the virtual central axis, the flat cable winder 4 even when stomped by the passenger is configured to prevent its rotating body 45 from being damaged.

Furthermore, since the protector 7 covers the part wired from the flat cable housing 6 to the slide sheet of the flat cable traversing the rail 3, it is made possible to protect the part wired from the flat cable housing 6 to the slide sheet of the flat cable 2 traversing the rail 3.

Figure 9:
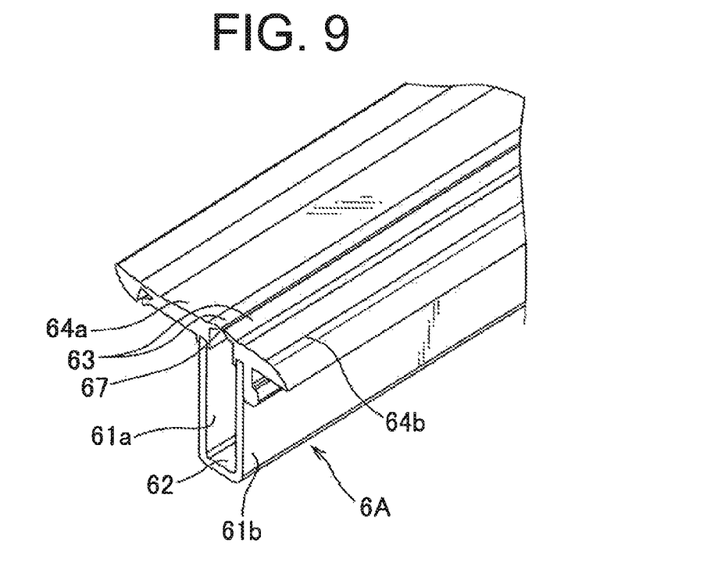
FIG. 9 is a perspective view illustrating another example of the flat cable housing shown in FIG. 7.

Note that in the aforementioned embodiment while the flat cable housing 6 is composed of the pair of walls 61*a*, 61*b*, and the bottom wall 62, the invention is not limited to this configuration, but alternatively the flat cable housing 6A, as shown in FIG. 9, may be provided with the pair of walls 61*a*, 61*b*, the bottom wall 62, a pair of inward flanges 63 extending from each upper end of the pair of walls 61*a*, 61*b* in a direction approaching each other and covering the opening between the pair of walls 61*a*, 61*b*, and a pair of outward flanges 64*a*, 64*b* extending from each upper end of the pair of walls 61*a*, 61*b* in a direction separating from each other. The pair of inward flanges 63 and the pair of outward flanges 64*a*, 64*b* may be made of elastic synthetic resin (e.g., rubber). The pair of inward flanges 63 and the pair of outward flanges 64*a*, 64*b*ω$\bar{\xi}$ω$\bar{ω}$ω may be insertion-molded to the pair of walls 61*a*, 61*b*. The pair of inward flanges 63 corresponds to the "flange" in the claims. In FIG. 9 the same part as the aforementioned embodiment is provided with the same reference sign and is not repeated to describe herein.

In the aforementioned embodiment while the flat cable housing 6A is provided with the pair of walls 61*a*, 61*b*, the bottom wall 62, the pair of inward flanges 63, and the pair of outward flanges 64*a*, 64*b*, the invention is not limited to this configuration, but may not be provide with the pair of outward flanges 64*a*, 64*b*. Namely, the flat cable housing 6A may be merely provided with the pair of walls 61*a*, 61*b*, the bottom wall 62, the pair of inward flanges 63.

According to the embodiment, since the flat cable housing 6A is provided with the inward flange, foreign object such as fluid or sand is prevented from entering into the flat cable housing 6A.

Second Embodiment

Figure 10:
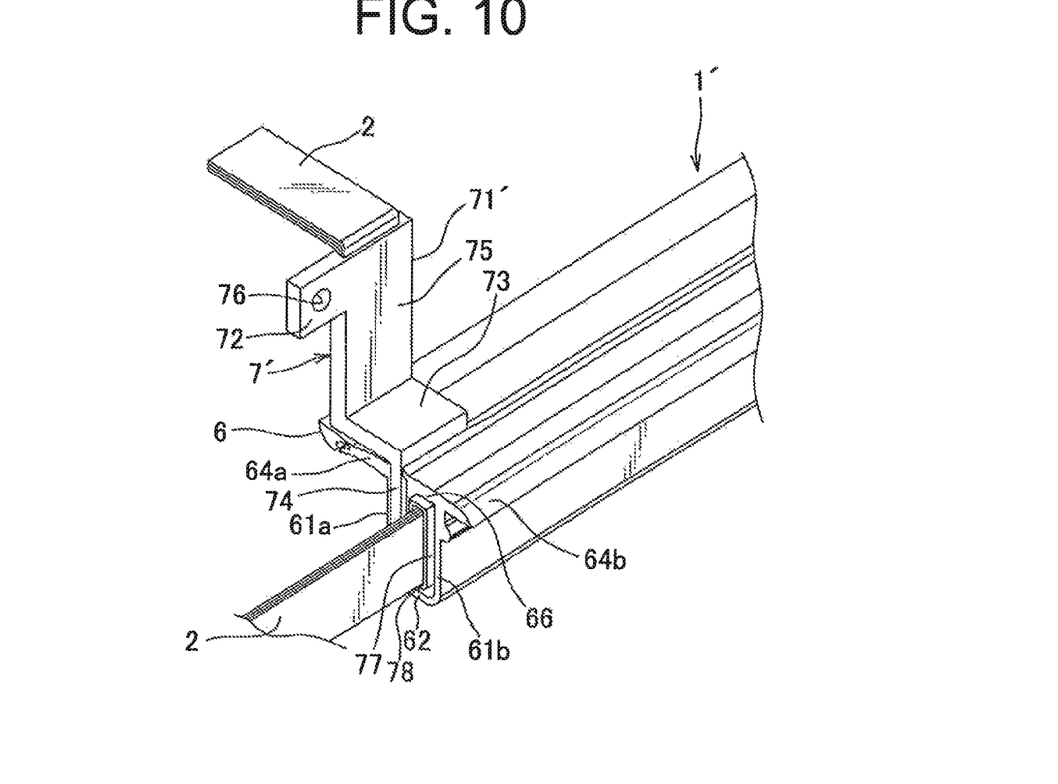
FIG. 10 is a perspective view illustrating a flat cable wiring structure according to second embodiment of the present invention.

The flat cable wiring structure 1' is, as shown in FIG. 10, is provided with a flat cable wider 4 disposed at an end of the rail 3 and configured to wind an excess of the flat cable 2, a flat cable housing 6' stacked onto the side wall 32 of the rail 3 and extending in the longitudinal direction of the rail 3, and a protector 7' the part of the flat cable 2 wired from the flat cable housing 6' to the slide sheet. In FIG. 10 the same part as the aforementioned embodiment is provided with the same reference sign and is not repeated to describe herein.

The flat cable housing 6' is provided with a pair of walls 61*a*, 61*b* parallel to the side wall 32 of the rail 3, a bottom wall 62 connecting lower ends of the pair of walls 61*a*, 61*b* with each other, a partition wall 65 disposed between the pair of walls 61*a*, 61*b* and parallel to each walls 61*a*, 61*b*, a ceiling wall 66 opposed to the bottom wall 62 and connecting with each other upper ends of the one wall 61*b* of the pair of walls 61*a*, 61*b*, a pair of inward flanges 63 extending from each upper end of the pair of walls 61*a*, 61*b* in a direction approaching each other and covering the opening between the pair of walls 61*a*, 61*b*, and a pair of outward flanges 64*a*, 64*b* extending from each upper end of the pair of walls 61*a*, 61*b* in a direction separating from each other. The outward flange 64*a* of the pair of outward flanges 64*a*, 64*b* is opposed to the opposite wall 33*b* of the rail 3. The flat cable housing 6' is made of elastic synthetic resin (e.g., rubber).

The protector 7' is provided with a protector body 71' covering a part of the flat cable wired from the flat cable housing 6 to the slide sheet, and a fixing part 72 fixing the protector body 71' to a sheet frame composing the slide sheet.

The protector 71' is provided with a horizontal part 73 opposed to the one outward flange 64*a*, a first vertical, part 74 continuous with one end of the horizontal part 73 in the arrow X direction and positioned between the one wall 61*a* of the flat cable housing 6 and the partition wall 65, a second vertical part 75 parallel to the first vertical part 74, a third vertical part 77 spaced from, and parallel to, first vertical part 74 and positioned between the other wall 61*b* of the flat cable housing 6 and the partition wall 65, and a coupling part 78 coupling the first vertical part 74 and the third vertical part 77. The third vertical part 77 covers a part bent into L-shape of the other end of the three flat cables 2.

According to the aforementioned embodiment, since provision of the partition wall 65 disposed between the pair of walls 61*a*, 61*b*, and the ceiling wall 66 opposed to the bottom wall 62 and connecting one of the pair of walls 61*a*, 61*b* and the partition wall 65, foreign object such as fluid or sand is prevented from entering into the flat cable housing 6'.

Note that while in the aforementioned embodiment the flat cable wiring structures 1, 1' are provided with the flat cable winder 4, flat cable housings 6, 6A, 6', and the protectors 7, 7', the invention is not limited to this configuration, or is not provided with the protectors 7, 7'. Namely, the flat cable winding structures 1, 1' may be provided with the flat cable winder 4 and the flat cable housing 6, 6A, 6'.

Figure 11:
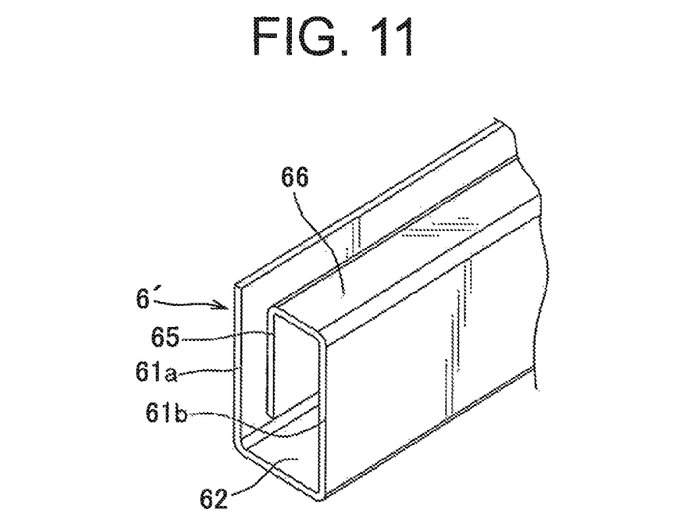
FIG. 11 is a perspective view illustrating another example of the flat cable housing composing the flat cable wiring structure shown in FIG. 10.

Note that while in the aforementioned embodiment the flat cable housing 6' is provided with the pair of walls 61a, 61b, the bottom wall 62, the partition wall 65, the ceiling wall 66, the pair of inward flanges 63, the pair of outward flanges 64a, 64b, the invention is not limited to this configuration, or as shown in FIG. 11, is not provided with the pair of inward flanges 63 and the pair of outward flanges 64a, 64b. Namely, the flat cable housing 6' may be provided with the pair of walls 61a, 61b, the bottom wall 62, the partition wall 65, the ceiling wall 66. In FIG. 11 the same part as the aforementioned embodiment is provided with the same reference sign and is not repeated to describe herein.

Moreover, while in the aforementioned embodiment the flat cable wiring structures 1, 1' are the structures for attaching the slide sheet (movable member) slidably to the rail 3 arranged on the car body floor, and for wiring the flat cable 2 from the car body floor to the slide sheet, the invention is, not limited to the above, for attaching the slide sheet (movable member) slidably to the rail 3 arranged on the car body floor, and for wiring the flat cable 2 from the car body floor to the slide door.

Note that the aforementioned embodiments merely show such as, but not limited to, typical embodiment of the present invention. Namely, it is to be understood that various changes and modifications will be apparent to those skilled in the art. Therefore, unless otherwise such changes and modifications depart from the scope of the present invention hereafter defined, they should be construed as being included therein.

REFERENCE SIGNS LIST

1, 1' flat cable wiring structure
2 flat cable
3 rail
32 side wall
4 flat cable winder
41 lower case (case)
42 base wall
43 peripheral wall
44 large-diameter shaft (shaft)
45 rotating body
55 through hole
6, 6A, 6' flat cable housing
61a, 61b pair of walls
62 bottom wall
63 inward flange (flange)
65 partition
66 ceiling wall
7, 7' protector

The invention claimed is:

1. A flat cable wiring structure, comprising:
a rail horizontally arranged on a car body floor, wherein a flat cable is wired from the car body floor to a movable member slidably attached to the rail;
a flat cable winder including
a case arranged at an end of the rail, and
a rotating body accommodated in the case rotatably about a virtual central axis vertical to the car body floor and configured to wind the flat cable thereabout;
a flat cable housing extending in a longitudinal direction of the rail and including
a pair of walls arranged along an outside surface of the rail and parallel to a vertical side wall of the rail, and
a bottom wall connecting the pair of walls; and
a protector covering a part wired from the flat cable housing to the movable member of the flat cable traversing the rail.

2. The flat cable wiring structure as claimed in claim 1, wherein the case is provided with a horizontal base wall configured to be arranged on the car body floor, a peripheral wall upstanding from the base wall, and a shaft upstanding from the base wall and inserted into a through hole including the virtual central axis.

3. The flat cable wiring structure as claimed in claim 1, wherein the flat cable housing is provided with a flange extending inwardly from each upper end of the pair of walls in a direction approaching each other.

4. The flat cable wiring structure as claimed in claim 1, further comprising a partition wall disposed between the pair of walls and parallel to each of the pair of walls, and a ceiling wall opposed to the bottom wall and connecting one of the pair of walls and the partition wall.

5. The flat cable wiring structure as claimed in claim 2, wherein the flat cable housing is provided with a flange extending inwardly from each upper end of the pair of walls in a direction approaching each other.

6. The flat cable wiring structure as claimed in claim 2, further comprising a partition wall disposed between the pair of walls and parallel to each of the pair of walls, and a ceiling wall opposed to the bottom wall and connecting one of the pair of walls and the partition wall.

* * * * *